United States Patent
An et al.

(10) Patent No.: US 8,979,294 B2
(45) Date of Patent: Mar. 17, 2015

(54) CURVED DISPLAY DEVICE

(71) Applicant: Samsung Electronics Co., Ltd., Suwon (KR)

(72) Inventors: Jun Seok An, Suwon (KR); Chan Hong Park, Anyang (KR); Kun Ho Cho, Suwon (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 0 days.

(21) Appl. No.: 13/952,991

(22) Filed: Jul. 29, 2013

(65) Prior Publication Data

US 2014/0078720 A1    Mar. 20, 2014

(30) Foreign Application Priority Data

Sep. 14, 2012    (KR) .................. 10-2012-0102455

(51) Int. Cl.
  *G09F 13/08*    (2006.01)
  *G09F 13/10*    (2006.01)
  *G02F 1/1335*   (2006.01)
  *G09G 3/34*     (2006.01)

(52) U.S. Cl.
  CPC ........ *G02F 1/133603* (2013.01); *G09G 3/3426* (2013.01); *G09G 2320/0238* (2013.01); *G09G 2320/0646* (2013.01); *G09G 2380/02* (2013.01)
  USPC .............. 362/97.4; 362/561; 362/249.02

(58) Field of Classification Search
  USPC .................................. 313/364–482
  See application file for complete search history.

(56) References Cited

U.S. PATENT DOCUMENTS

| | | | | |
|---|---|---|---|---|
| 2004/0130912 | A1* | 7/2004 | Miyashita | 362/561 |
| 2007/0091639 | A1* | 4/2007 | Yoo | 362/612 |
| 2010/0208494 | A1* | 8/2010 | Kuo et al. | 362/612 |
| 2010/0259470 | A1* | 10/2010 | Kohtoku et al. | 345/102 |
| 2010/0328339 | A1* | 12/2010 | Cho et al. | 345/589 |
| 2011/0255039 | A1* | 10/2011 | Enomoto | 349/113 |
| 2012/0056907 | A1* | 3/2012 | Lee et al. | 345/690 |
| 2012/0139445 | A1* | 6/2012 | Fujiwara et al. | 315/294 |

* cited by examiner

*Primary Examiner* — Donald Raleigh
(74) *Attorney, Agent, or Firm* — Staas & Halsey LLP

(57) ABSTRACT

A curved display device is provided including a display panel having a constant curvature and displaying an image, a backlight unit having the same curvature as that of the display panel, disposed at a rear surface of the display panel, and emitting light to the display panel, and a control unit locally controlling light emission of the backlight unit such that luminance of a light leakage region of the display panel is adjusted. Occurrence of light leakage in the curved display device is prevented, and thus, luminance of the curved display device is kept constant.

28 Claims, 11 Drawing Sheets

CURVED DISPLAY DEVICE

CROSS-REFERENCE TO RELATED APPLICATIONS

This application is related to, and claims priority to, Korean Patent Application No. 10-2012-0102455, filed on Sep. 14, 2012 in the Korean Intellectual Property Office, the disclosure of which is incorporated herein by reference.

BACKGROUND

1. Field

Embodiments of the present invention relate to a curved display device having improved image quality.

2. Description of the Related Art

Display devices are apparatuses that may display three-dimensional visual image information.

Recently, flat panel display devices, which have a relatively small weight and volume as compared to cathode ray tubes, and thus are less limited in terms of installation and space, and exhibit excellent performance have been developed. A large-screen image display that may be easily formed as a flat panel display and having high image quality, and the like, has been developed.

Examples of a flat panel display device include a liquid crystal display (LCD) device, an electroluminescent display (ELD) device, a field emission display (FED) device, a plasma display panel (PDP), a thin film transistor liquid crystal display (TFT-LCD) device, and a flexible display device.

The display devices may be classified according to an installation method, which varies according to installation position, e.g., a wall-mounted type in which a display device is installed on a wall, and a stand type in which a display device is supported by a stand.

When such a flat panel display device is installed in an open space, such as an outdoor public square, or an indoor public area, such as an airport, a terminal, or the like, an image displayed on the display device may be distinctly recognized by a viewer within certain viewing angles of the flat panel display device, but it may be impossible for a viewer outside of the viewing angles thereof to recognize the image displayed on the display device.

Therefore, a curved display device, which may draw attention of viewers within a large area when installed in a large, open space, such as an indoor or outdoor public square, and in which an image displayed on the display device may be recognized by viewers within a large area regardless of direction, has been developed.

Such a curved display device may emit light to a display panel using an edge type backlight unit disposed at an edge of a light guide plate or a backlight unit disposed at a rear surface of the display panel, thereby displaying an image on the display panel, which has a constant curvature. However, luminance at a specific position of the display panel having a curvature is non-uniform, and thus, defects such as reduction in image quality may occur.

SUMMARY

It is an aspect of the present invention to provide a curved display device in which, when a dark image is displayed on a display panel having a constant curvature, a light emitting diode (LED) disposed in a predetermined location is turned off, thereby locally adjusting luminance of a backlight unit.

It is an aspect of the present invention to provide a curved display device in which LEDs of a backlight unit are arranged in predetermined light leakage regions based on a curvature and size of a display panel.

It is an aspect of the present invention to provide a curved display device that confirms whether an image signal to be displayed on a display panel is a dark image and compares a location where the dark image is to be displayed and a predetermined light leakage region if the image signal is a dark image to control a LED of a backlight unit arranged in the light leakage region to be turned off.

Additional aspects of the invention will be set forth in part in the description which follows and, in part, will be obvious from the description, or may be learned by practice of the invention.

In accordance with an aspect of the present invention, a curved display device includes a display panel having a constant curvature and displaying an image, a backlight unit having the same curvature as that of the display panel, disposed at a rear surface of the display panel, and emitting light to the display panel, and a control unit locally controlling light emission of the backlight unit such that luminance of a light leakage region of the display panel is adjusted.

The control unit may locally control light emission of the backlight unit when a dark image is to be displayed on the display panel.

The control unit may control luminance in a location corresponding to the light leakage region to be decreased and luminance in the remaining location to be maintained when locally controlling light emission of the backlight unit.

The backlight unit may include a base having the same curvature as that of the display panel, a plurality of light source units spaced apart from each other on the base, and light driving units each driving the light source unit.

The light source units may include a plurality of light emitting diode (LED) arrays.

The light driving units are of a flat panel type.

The LED arrays may be arranged in a direction perpendicular to the curvature of the display panel.

The display panel may have data lines formed to match a location of the LED arrays.

The light source units may be arranged at irregular intervals.

The backlight unit may directly emit light.

The light leakage region may be a predetermined region.

The predetermined light leakage region may be a region predetermined based on a curvature and size of the display panel.

The curved display device may include a storage unit storing location information of a light source unit of the backlight unit disposed in a location corresponding to the predetermined light leakage region.

The control unit may analyze an image signal to be displayed on the display panel to determine a location where a dark image is to be displayed and independently control the light source unit arranged in the determined location to be turned off when the determined location belongs to the predetermined light leakage region.

The control unit may control a level of the luminance based on brightness of dark color of the dark image.

The backlight unit may include a first light source unit disposed in the light leakage region, a first light driving unit driving the first light source unit, a second light source unit disposed in the remaining region, and a second light driving unit driving the second light source unit.

The control unit may analyze an image signal to be displayed on the display panel and control the first light source unit to be turned off when an image to be displayed on the light leakage region is a dark image.

The control unit may control the second light source unit to be turned on when an image to be displayed on the remaining region is a dark image.

The display panel may include a TFT array panel and a color filter array panel that have the constant curvature.

The curved display device may further include a diffusion plate disposed between the backlight unit and the display panel and diffusing light emitted from the backlight unit.

In accordance with an aspect of the present invention, a curved display device includes a display panel displaying an image and curved, a backlight unit disposed at a rear surface of the display panel, emitting light to the display panel, and curved corresponding to the curvature of the display panel, and a control unit independently controlling light emission of a plurality of first light emitting regions and a plurality of second light emitting regions of the backlight unit, wherein the first light emitting regions emits light to a plurality of light leakage regions of the display panel and the second light emitting regions emit light to the remaining regions of the display panel when an image is displayed.

The control unit may control luminance of the first light emitting regions to be decreased when a dark image is to be displayed on the light leakage regions of the display panel.

The light leakage regions may be regions predetermined based on a curvature and size of the display panel.

The curved display device may further include a storage unit storing location information of the light leakage regions and location information of the first light emitting regions respectively corresponding to the light leakage regions, wherein the control unit analyzes an image signal to be displayed on the display panel to determine whether a dark image is displayed on at least one of the light leakage regions, confirms a location of the first light emitting region corresponding to the light leakage region if it is determined that a dark image is displayed on the at least one light leakage region, and independently controls a light source unit disposed in the confirmed first light emitting region to be turned off.

In accordance with an aspect of the present invention, a curved display device includes a display panel having a constant curvature and displaying an image and a backlight unit having a first light emitting region emitting light to a light leakage region of the display panel and a second light emitting region emitting light to the remaining region of the display panel, wherein the first light emitting region and the second light emitting region independently emit light and light emission thereof is independently blocked.

The backlight unit may include a base having the constant curvature, a plurality of light source units disposed in the first and second light emitting regions, and light driving units disposed on the base and each driving the light source unit.

The light source units may include a first light source unit disposed in the first light emitting region and a second light source unit disposed in the second light emitting region.

The first light source unit may be turned off when a dark image is to be displayed on the light leakage region.

The light source units may be arranged at irregular intervals.

The backlight unit may directly emit light.

The predetermined light leakage region may be a region predetermined based on a curvature and size of the display panel.

According to an aspect of the present invention, occurrence of light leakage in a curved display device may be prevented.

In addition, luminance of an image may be kept constant and thus user satisfaction may be improved.

A light source unit of a direct-type backlight unit may be arranged in a direction perpendicular to a curvature of a display panel, and thus, a light driving unit, e.g., a printed circuit board (PCB) for driving the light source unit of the backlight unit is least affected by the curvature and it is thus easy to manufacture the light driving unit.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
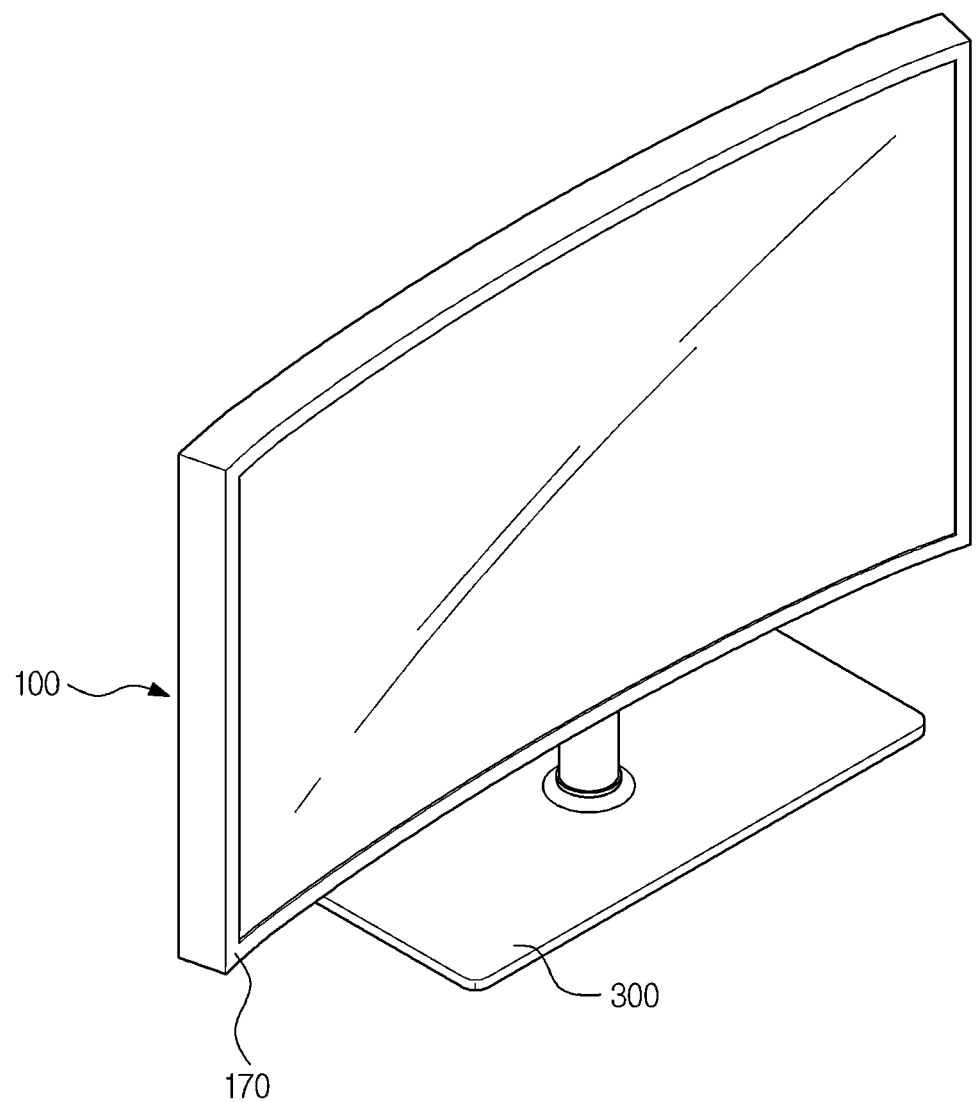
FIG. 1 illustrates a curved display device according to an embodiment.

Reference will now be made in detail to the embodiments of the present invention, examples of which are illustrated in the accompanying drawings, wherein like reference numerals refer to like elements throughout.

One or more embodiments of the present invention are described with reference to the accompanying drawings.

Figure 2:
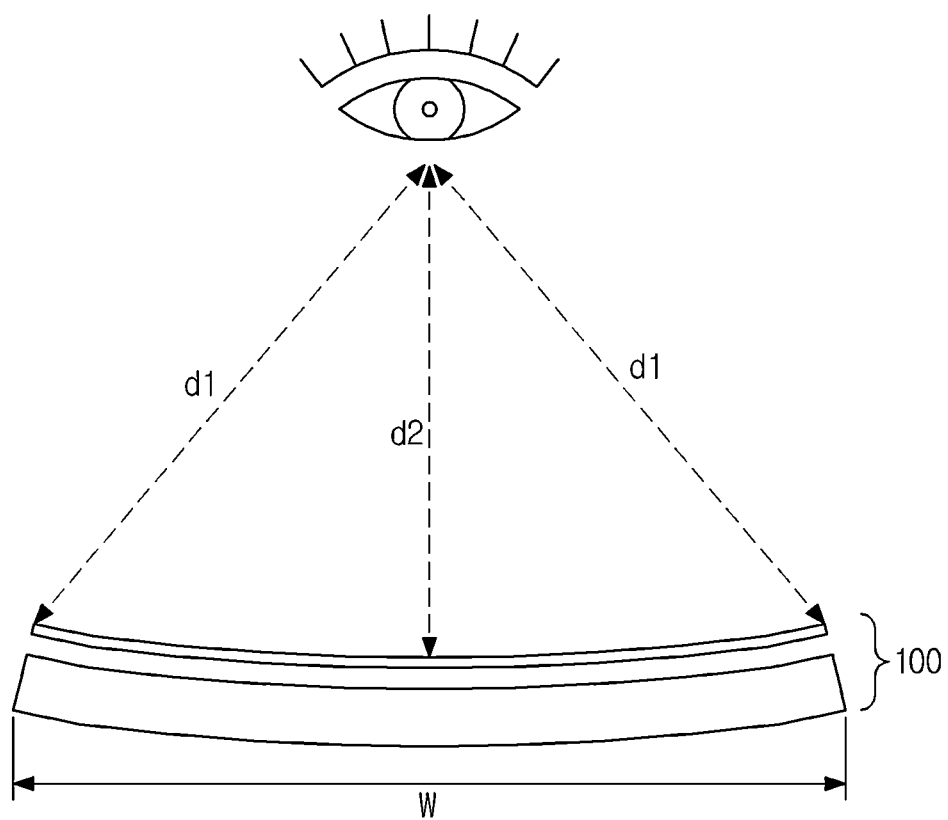
FIG. 2 illustrates exemplary viewing angles of the curved display device according to an embodiment.

FIG. 1 illustrates an exemplary curved display device according to an embodiment. FIG. 2 illustrates exemplary viewing angles of a curved display device according to an embodiment.

Curved display devices refer to image display devices, for example, display devices such as TVs, monitors, mobile communication terminals, and the like. As illustrated in FIG. 1, the curved display device includes a main body 100 having a curvature, e.g., a constant curvature and displaying an image and a stand 200, e.g., installed below the main body 100 to support the main body 100. The main body 100 may be installed on a wall using a bracket without the stand 200.

As illustrated in FIG. 2, the main body 100 may have a constant width W and a constant curvature formed along the width W and includes an image display surface displaying an image.

The main body 100 has a curvature such that when a user views the main body 100 from a front and center thereof, a distance d1 between a left or right side of the image display surface and an eye of the user is the same as or similar to a distance d2 between the center of the image display surface and the eye of the user.

Accordingly, when a two-dimensional image is displayed on the main body 100, the two-dimensional image may appear to have three-dimensional qualities. When a three-dimensional image is displayed on the main body 100, a user may watch a more natural three-dimensional image. The main body 100 is described in detail with reference to FIGS. 3 through 8.

Figure 3:
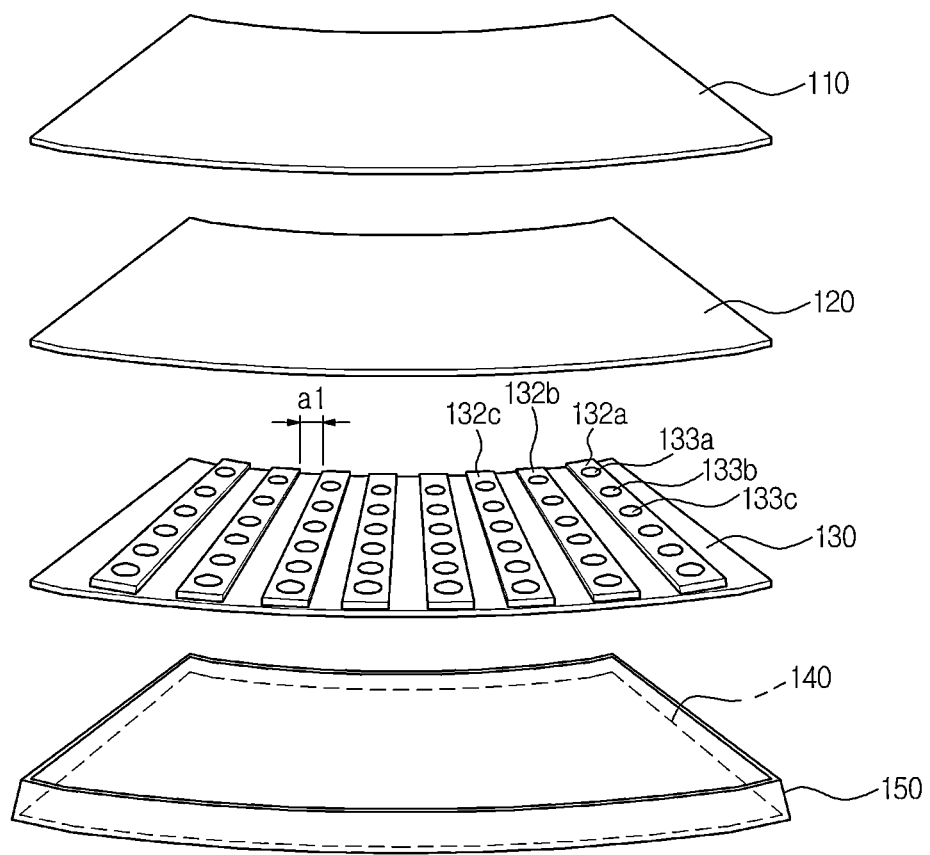
FIG. 3 is an exploded perspective view of an exemplary main body of the curved display device according to an embodiment.
Figure 4:
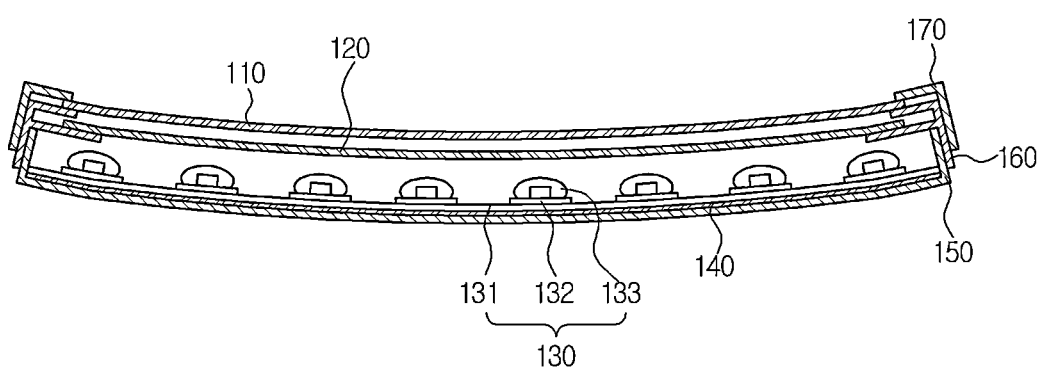
FIG. 4 is a cross-sectional view of an exemplary main body of the curved display device according to an embodiment.

As illustrated in FIGS. 3 and 4, the main body 100 having a constant curvature includes a display panel 110, a diffusion plate 120, a backlight unit 130, a chassis 140, a cover 150, a support member 160, and a bezel 170.

The display panel 110, which is an image display panel in which light transmittance of a liquid crystal layer (not shown) may be adjusted according to the intensity of an applied voltage, thereby displaying image information such as characters, numbers, icons, and the like, has a constant curvature.

Figure 5:
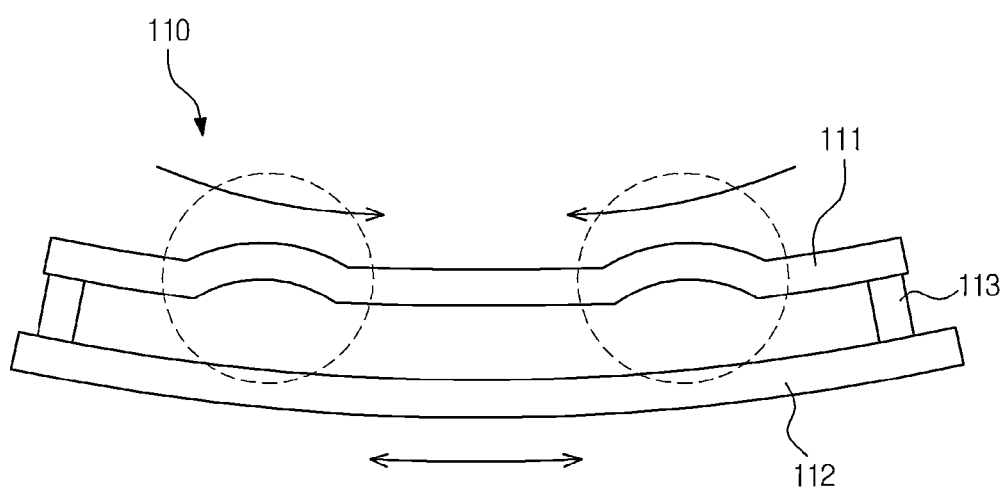
FIG. 5 illustrates an exemplary occurrence of light leakage of a curved display device according to an embodiment.

As illustrated in FIG. 5, the display panel 110 includes a color filter array panel 111, a thin film transistor (TFT) array panel 112, and a sealant 113. The color filter array panel 111 and the TFT array panel 112 may be made of glass.

The color filter array panel 111 includes red, green and blue color filters disposed at a region corresponding to a pixel electrode of the TFT array panel 112 so that each of a plurality of pixels displays colors. The color filter array panel 111 includes a common electrode formed of a transparent conductive material such as indium tin oxide (ITO) or indium zinc oxide (IZO).

The TFT array panel 112 of the display panel 110 may be spaced apart from the color filter array panel 111 and include a plurality of gate lines, a plurality of data lines, and the pixel electrode.

The gate lines may be arranged in a transverse direction to transmit a gate signal, the data lines are arranged in a longitudinal direction to transmit a data signal, and the pixel electrode is connected to the gate and data lines and includes a switching element and a storage capacitor.

The switching element may be disposed at an intersection of the gate line and the data line, and the storage capacitor is connected to an output terminal of the switching element.

Another terminal of the storage capacitor may be connected to a common voltage or the gate line.

The display panel 110 includes a liquid crystal layer interposed between the color filter array panel 111 and the TFT array panel 112. The liquid crystal layer includes a sealing material and liquid crystal that may be accommodated in the sealing material.

In the liquid crystal layer (not shown), an arrangement direction of liquid crystal molecules may be changed by a voltage applied from the outside. Light transmittance of the liquid crystal layer may be adjusted.

The color filter array panel 111, the TFT array panel 112, and the liquid crystal layer (not shown) of the display panel 110 may form a liquid crystal capacitor. The liquid crystal capacitor may be connected to the output terminal of the switching element of the pixel electrode and a common voltage or a reference voltage.

An image driving unit (not shown) may supply a gate driving signal and a data driving signal based on a gate control signal, a data control signal, and the related data signal to the gate and data lines formed on the TFT array panel 111, respectively, thereby displaying a desired image on the display panel 110.

The sealant 113 may be formed on edge portions of the color filter array panel 111 and the TFT array panel 112 of the display panel 110 to combine the color filter array panel 111 and the TFT array panel 112. The sealant 113 enables the curvature of the curved display panel 110 to be maintained.

The curved display panel 110 has a constant curvature. When the color filter array panel 111 and the TFT array panel 112 of the display panel 110 are formed to have a constant curvature, the color filter array panel 111 may be compressed and the TFT array panel 112 may be elongated.

Accordingly, as illustrated in FIG. 5, light leakage (or black MURA (mura is a Japanese word that may be defined as a dead pixel or black area) occurs in specific areas L1 through L8 (see, for example, FIG. 6) due to interaction between spacers to maintain a constant distance between the color filter array panel 111 and the TFT array panel 112.

That is, the display panel 110 includes light leakage regions and the remaining regions in which light leakage does not occur.

The light leakage regions may be non-uniform luminance regions of the display panel 110 because light of the backlight unit 130 is not effectively blocked when a black or dark image is displayed on the display panel 110, i.e., when a driving voltage is not applied to liquid crystal, and exhibits a higher luminance than the remaining regions.

The display panel 110 according to an exemplary embodiment has a constant curvature. Thus, when a dark or black image is displayed, luminance of the light leakage regions is adjusted, thereby displaying an image in a state in which light leakage is minimized.

The light leakage regions may be previously determined according to the size and curvature of the display panel 110 of the curved display device, and are regions that may be identified by experimentation.

Figure 6:
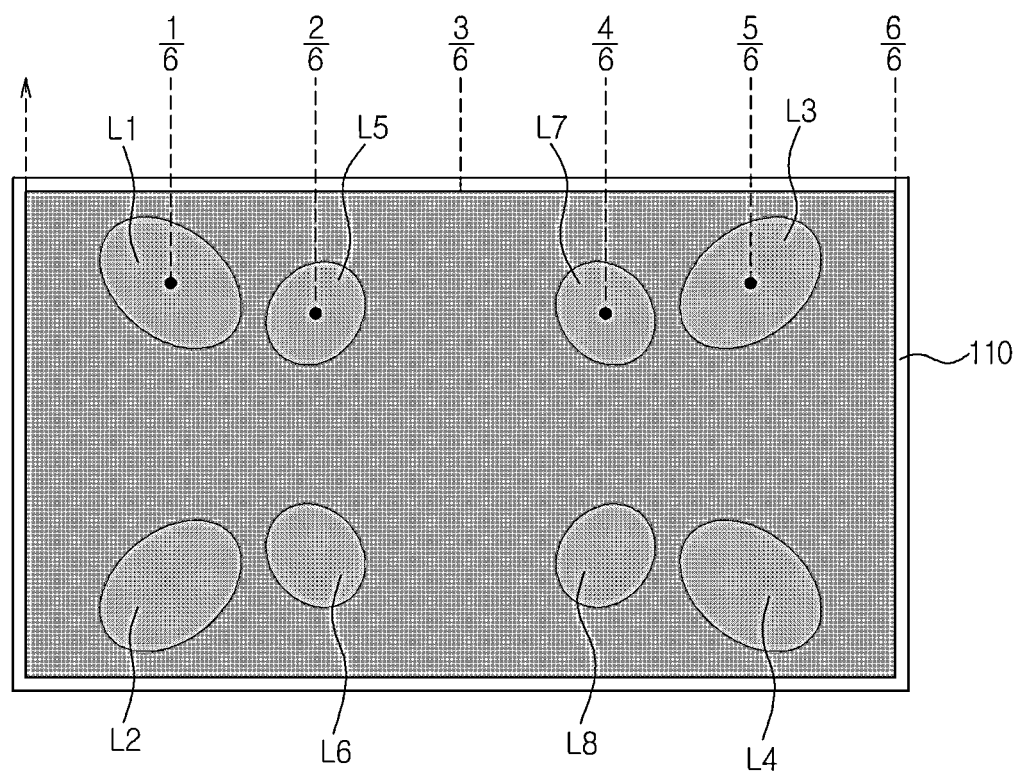
FIG. 6 illustrates predetermined light leakage regions of a curved display device according to an embodiment.

For example, as illustrated in FIG. 6, when the display panel 110 has a size of 55 inches and a curvature of 4000R, light leakage occurs on areas L1 and L5 and areas L2 and L6 respectively disposed in the vicinity of upper and lower portions of a region spaced apart from a left edge of the display panel 110 by ⅛th and ⅜th of the width of the display panel 110 and areas L3 and L7 and areas L4 and L8 respectively disposed in the vicinity of upper and lower portions of a region spaced apart from the left edge of the display panel 110 by ⅝th and ⅞th of the width of the display panel 110, each of which has a diameter of approximately 150 mm.

The curved display device may include glass to protect the display panel 110 from external impact and a filter.

The glass prevents the filter from being broken by external impact, and the filter includes an optical characteristic film, an electromagnetic interference (EMI) shielding film, an infrared light shielding film, and the like.

The optical characteristic film decreases brightness of red (R) and green (G) of light incident on the display panel 110 and increases brightness of blue (B) thereof to improve optical characteristics of the display panel 110. The EMI shielding film shields electromagnetic waves to prevent electromagnetic waves incident on the display panel 110 from being emitted to the outside.

The infrared light shielding film shields infrared light radiated from the display panel 110 to prevent more than a certain amount of the infrared light from being emitted to the outside so that signals transmitted using infrared light, such as signals of a remote controller, are normally transmitted.

The diffusion plate 120 may be disposed between the display panel 110 and the backlight unit 130 and may be a semitransparent panel that diffuses light emitted from the backlight unit 130 along a plane to provide uniform color and brightness to the entire screen. The diffusion plate 120 improves brightness or the like of light emitted from the backlight unit 130 to supply the light to the display panel 110. That is, the diffusion plate 120 intensifies light of light emitting diodes (LEDs) of the backlight unit 130 and uniformly maintains brightness of the entire surface of the display panel 110.

The backlight unit 130 is a light source that emits light, for example, from a rear surface of the display panel 110 and may be a direct LED light source.

In other words, liquid crystal of the display panel 110 may not be able to emit light, and thus a transmission amount and colors of light emitted from the backlight unit 130 are adjusted to display an image.

The backlight unit 130 includes a base 131 having a constant curvature, light driving units 132 that may be fixed to the base 131, and a plurality of light source units 133 that emit light using electricity supplied from the light driving units 132.

The light source units 133 may be LEDs that emit light at high efficiency and low power consumption. The light driving units 132 supply electricity to the LEDs or block the supply of the electricity to the LEDs or adjust the intensity of the electricity supplied to the LEDs and are printed circuit boards (PCBs) with the LEDs electrically mounted thereon.

The light source units 133 include a plurality of LED arrays each including the plurality of LEDs, and the LED arrays, which are designated by reference numerals 133a, 133b, and 133c, are respectively electrically connected to a plurality of light driving units 132a, 132b, and 132c.

As illustrated in FIG. 3, the light driving units 132a, 132b, and 132c may be in the form of a flat panel and arranged on the base 131 at a constant interval a1.

The plurality of LED arrays may be irregularly arranged on the base 131 at positions corresponding to predetermined light leakage regions.

Figure 7:
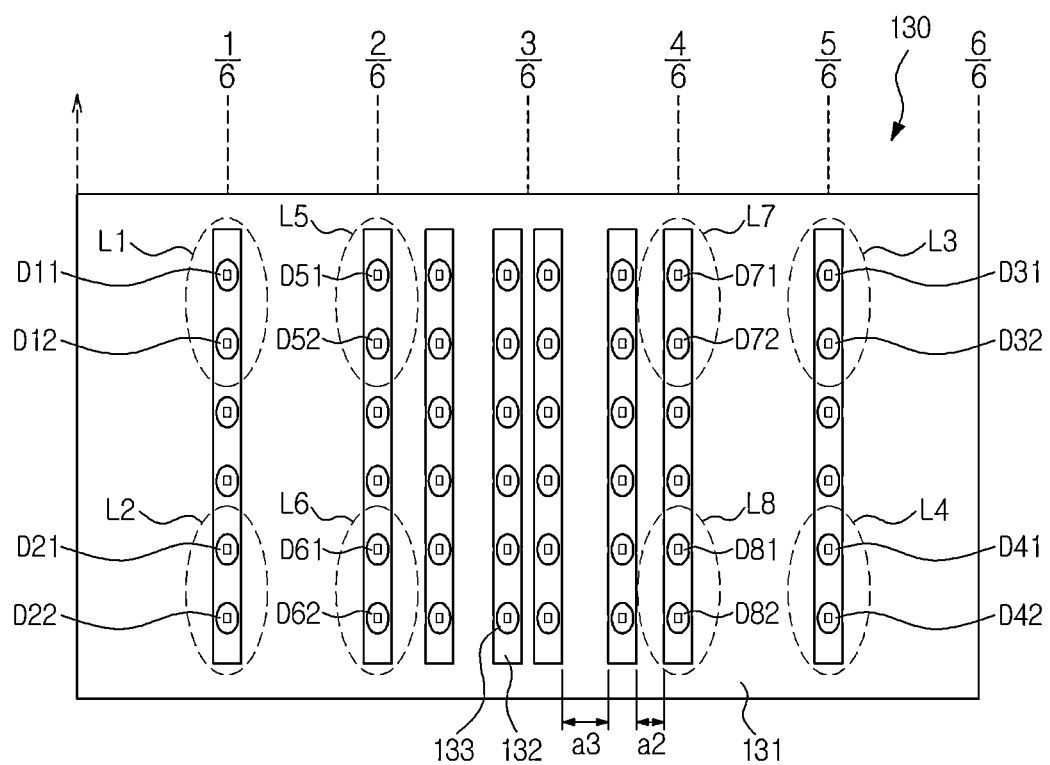
FIG. 7 illustrates an exemplary backlight unit included in a curved display device according to an embodiment.

As illustrated in FIG. 7, when the display panel 110 has a size of 55 inches and a curvature of 4000R, light leakage regions are areas L1 and L5 and areas L2 and L6 respectively disposed in the vicinity of upper and lower portions of a region spaced apart from a left edge of the display panel 110 by ⅛th and ⅜th of the width of the display panel 110 and areas L3 and L7 and areas L4 and L8 respectively disposed in the vicinity of upper and lower portions of a region spaced apart from the left edge of the display panel 110 by ⅝th and ⅞th of the width of the display panel 110, each of which has a diameter of approximately 150 mm. Thus, LED arrays may be arranged based on first light emitting regions respectively corresponding to the areas L1, L2, L3, L4, L5, L6, L7 and L8.

That is, the backlight unit 130 includes the first light emitting regions corresponding to the light leakage regions and second light emitting regions corresponding to the remaining regions. Since the LED arrays may be arranged based on the light leakage regions, a distance a2 between the LED arrays arranged in the first light emitting regions may be different from a distance a3 between the LED arrays arranged in the second light emitting regions.

When a black image is displayed on the light leakage regions, LEDs D11, D12, D21, D22, D31, D32, D41, D42, D51, D52, D61, D62, D71, D72, D81 and D82 arranged in the first light emitting regions corresponding to the light leakage regions may be independently turned off, whereby light leakage may be prevented.

Figure 8:
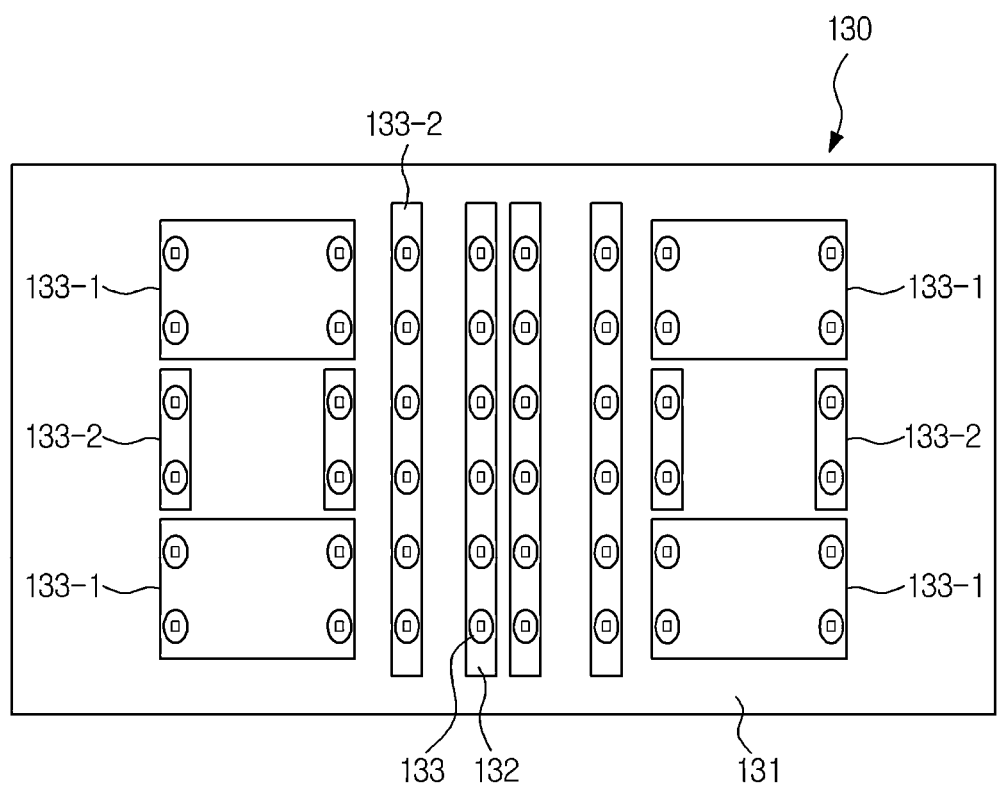
FIG. 8 illustrates an exemplary backlight unit included in a curved display device according to an embodiment.

According to an embodiment, as illustrated in FIG. 8, a first LED array 133-1, which is a first light source unit, may be disposed in each of a plurality of first light emitting regions, and a second LED array 133-2, which is a second light source unit, may be disposed in each of a plurality of second light emitting regions. The first light source unit and the second light source unit may have a structure in which a plurality of LEDs are separately disposed, and not configured in the form of an array.

When the display panel 110 has a size, for example, of 55 inches and a curvature, for example, of 4000R, light leakage regions are areas L1 and L5 and areas L2 and L6 respectively disposed in the vicinity of upper and lower portions of a region spaced apart from a left edge of the display panel 110 by ⅛th and ⅜th of the width of the display panel 110 and areas L3 and L7 and areas L4 and L8 respectively disposed in the vicinity of upper and lower portions of a region spaced apart from the left edge of the display panel 110 by ⅝th and ⅞th of the width of the display panel 110, each of which has a diameter of approximately 150 mm. Thus, the first LED array 133-1 may be disposed in each of the first light emitting regions respectively corresponding to the light leakage regions L1 through L8, and the second LED array 133-2 is disposed in each second light emitting region.

In addition, when a black image is displayed on the light leakage region, the first LED array 133-1 arranged in the first light emitting region corresponding to the light leakage region may be turned off, whereby light leakage may be prevented.

A plurality of LED arrays of the backlight unit 130, which is of a direct type, may be arranged in a longitudinal direction, i.e., in a direction perpendicular to a direction in which the display panel 110 or the base 131 is curved, and thus, the LED arrays are less affected by the curvature when the light driving units 132 are installed on the base 131.

The light driving units 132, e.g., PCBs may have a small width and may have a smaller curvature than the base 131, and thus, flat-type PCBs may be installed as the light driving units 132 on the base 131. Accordingly, it is easy to manufacture PCBs used to drive the LEDs of the backlight unit 130 because there is no need to form a curvature in the PCBs.

The chassis 140 is a panel that connects elements needed to display an image and output sound and may include various kinds of PCBs, input and output devices, and the like.

The chassis 140 may be made of a metal having excellent heat dissipation performance and high strength.

The chassis 140 includes a signal processor 181 (see, for example, FIG. 9) that processes external broadcast signals or external image signals to be displayed on the display panel 110, a control unit 182 (see, for example, FIG. 9) that controls driving of the display panel 110 and the backlight unit 130 based on signal processing results, and a storage unit 183 (see, for example, FIG. 9) that stores information of a light source unit for control of light leakage regions and luminance.

The chassis 140 may include a power supply unit that supplies driving electricity to each of a plurality of constituent units, an image driving unit that drives the display panel 110 based on commands from the control unit 182, a communication unit that communicates with an external device, and a sound unit that outputs sound.

The chassis 140 may have a curved or flat shape.

The cover 150 may be separably coupled to the bezel 170 or the support member 160 and forms an accommodation space when coupled to the bezel 170. In the accommodation space, the display panel 110, the diffusion plate 120, the backlight unit 130, and the chassis 140 may be disposed.

The cover 150 may also have a constant curvature.

The support member 160 may be disposed between the cover 150 and the bezel 170 so that the display panel 110 and the diffusion plate 120 are spaced apart from each other by a first distance and the diffusion plate 120 and the backlight unit 130 are spaced apart from each other by a second distance.

The support member 160 supports the display panel 110 and the diffusion plate 120.

The support member 160 may also have a constant curvature so as to support the display panel 110 and the diffusion plate 120 that have a constant curvature, in close contact therewith.

The bezel 170 fixes the display panel 110 supported by the support member 160 and is separably coupled to the support member 160 or the cover 150.

Figure 9:
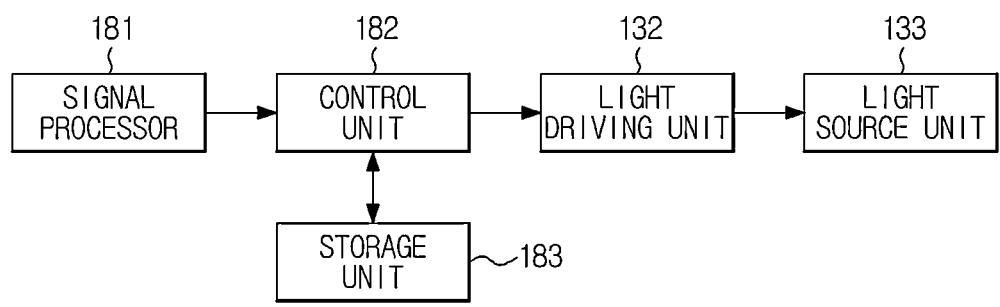
FIG. 9 illustrates an exemplary control of a curved display device according to an embodiment.

FIG. 9 illustrates an exemplary control of the curved display device according to an embodiment, and described with reference to FIGS. 7 and 10.

The curved display device includes the signal processor 181, the control unit 182, the storage unit 183, and the light driving units 132.

The signal processor 181 processes external broadcast signals or external image signals to be displayed on the display panel 110.

That is, the signal processor 181 divides broadcast signals into image signals having image data, sound signals having sound data, and additional signals having additional data and processes the image signals and the sound signals.

The control unit 182 controls driving of the display panel 110 and the backlight unit 130 based on signal processing results.

The control unit 182 controls luminance of the predetermined light leakage regions by analyzing an image signal to be displayed on the display panel 110 to determine a location where a dark or black image is to be displayed, determining the first light emitting region corresponding to the predetermined light leakage region if the determined location belongs to at least one of the predetermined light leakage regions, confirming the light source unit disposed in the determined first light emitting region, and controlling the confirmed light source unit to be turned off.

Figure 10A:
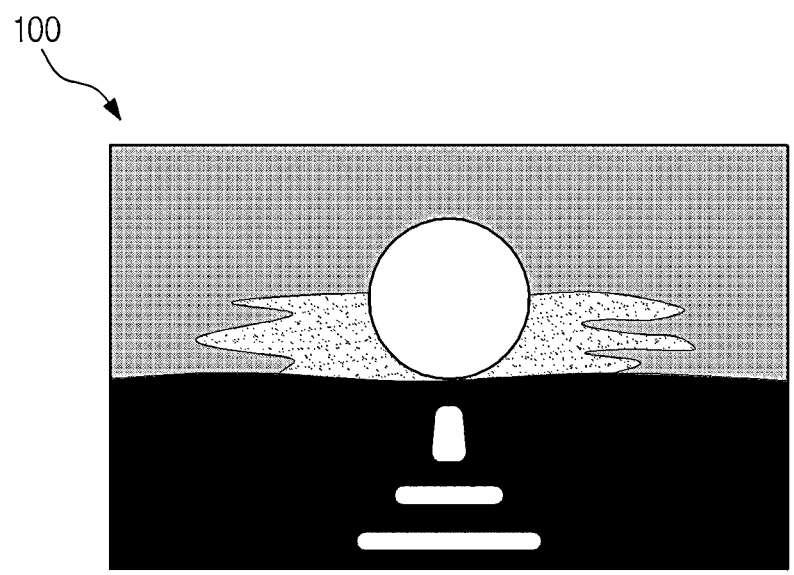
FIGS. 10A and 10B illustrate exemplary prevention of light leakage of a curved display device according to an embodiment.
Figure 10B:
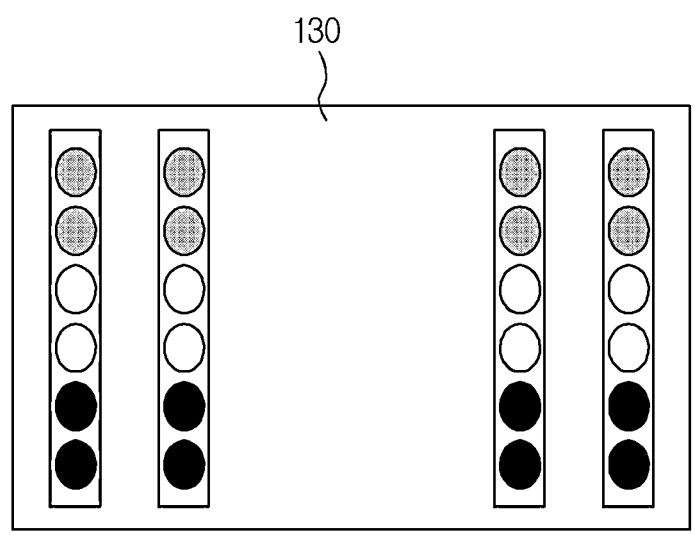

As illustrated in FIG. 10A and FIG. 10B, the control unit 182 determines whether a black image is present based on the image signals processed by the signal processor 181, confirms a location of the black image if it is determined that the black image is present, confirms the LEDs D21, D22, D61, D62, D41, D42, D81 and D82 arranged in the light leakage regions if it is determined that the confirmed location belongs to the light leakage regions by comparing the confirmed location and the light leakage regions, and then controls the confirmed LED to be turned off.

That is, the control unit 182 independently controls only the light source unit 133 arranged in a location where a black image is to be displayed among the light source units arranged in the predetermined light leakage regions, to be turned off.

The control unit 182 may control the amount of light emitted from the LEDs based on brightness of dark color of the dark image so that a level of luminance is controlled.

For example, as illustrated in FIG. 10A and FIG. 10B, the control unit 182 determines whether a dark image is present based on the image signals processed by the signal processor 181, confirms a location of the dark image if it is determined that the dark image is present, confirms the LEDs D11, D12, D51, D52, D31, D32, D71 and D72 arranged in light leakage regions if it is determined that the confirmed location belongs to the light leakage regions by comparing the confirmed location and the light leakage regions, and controls electricity applied to the confirmed LED, thereby controlling the amount of light emitted from the LEDs.

The control unit 182 may confirm brightness of the dark color and control the intensity of the electricity applied to the LEDs. The dark color as used herein refers to black or a color having higher brightness than black.

That is, when an image as depicted in FIG. 10A needs to be displayed on the display panel 110, the backlight unit 130 controls the LEDs arranged in the areas L2, L4, L6 and L8 among the first light emitting regions to be turned off, reduces the amount of light emitted from the LEDs arranged in the areas L1, L3, L5 and L7 among the first light emitting regions, and drives the LEDs arranged in the second light emitting regions corresponding to the remaining regions to be turned on.

The storage unit 183 stores information of the predetermined light leakage regions and location information of the LEDs D11, D12, D21, D22, D31, D32, D41, D42, D51, D52, D61, D62, D71, D72, D81 and D82 arranged in the first light emitting regions corresponding to the light leakage regions.

The storage unit 183 may also store turn-off time of the LEDs of the first light emitting regions so that the LEDs of the first light emitting regions are temporarily turned off when light leakage is prevented.

The storage unit 183 may also store the intensity of the electricity applied to the LEDs arranged in the first light emitting regions, based on brightness of black or dark color of the black or dark image.

The light driving units 132 respectively drive a plurality of light source units of the backlight unit 130 based on commands from the control unit 182. The LEDs arranged in the first light emitting regions are independently driven.

A location of light leakage regions may be previously determined and then the LEDs of the backlight unit 130 are arranged, and when a black image needs to be displayed on the display panel 110, the LED arranged in the light leakage region is temporarily turned off, whereby light leakage according to reduction in luminance may be prevented.

Figure 11:
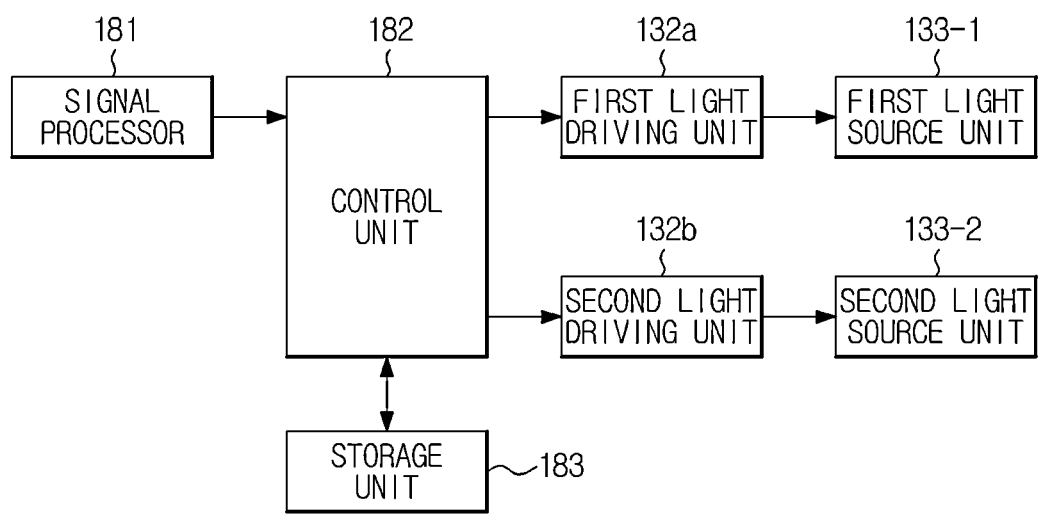
FIG. 11 illustrates an exemplary control of a curved display device according to an embodiment.

FIG. 11 illustrates an exemplary control of a curved display device according to an embodiment of the present invention, and an embodiment will be described with reference to FIG. 8.

The curved display device includes a signal processor 181, a control unit 182, a storage unit 183, a first light driving unit 132a, and a second light driving unit 132b.

The signal processor 181 has already been previously described embodiment, and thus, a detailed description thereof is not repeated.

The control unit 182 controls driving of the display panel 110 and the backlight unit 130 based on signal processing results.

The control unit 182 transmits a driving control signal for driving first light source units 133-1 and second light source units 133-2 to the first light driving unit 132a and the second light driving unit 132b so that the first and second light source units 133-1 and 133-2 included in the backlight unit 130 are independently driven.

The control unit 182 controls luminance of predetermined light leakage regions by analyzing an image signal to be displayed on the display panel 110 to determine a location where a dark or black image is to be displayed, determining a first light emitting region corresponding to the light leakage region if the determined location belongs to at least one of the light leakage regions, confirming the first light source unit 133-1 disposed in the determined first light emitting region, controlling the confirmed first light source unit 133-1 to be turned off, and controlling the remaining first light source units 133-1 and the second light source units 133-2 to be turned on.

That is, the control unit 183 independently controls only the first light source unit 133-1 disposed in a location where a black image is to be displayed among the first light source units 133-1 arranged in the light leakage regions to be turned off.

The control unit 182 controls the amount of light emitted from the first light source units 133-1 by determining whether a dark image is present based on an image signal processed by the signal processor 181, confirming a location of the dark image if it is determined that the dark image is present, confirming the first light emitting region corresponding to the light leakage region if it is determined that the confirmed location belongs to at least one of the light leakage regions by comparing the confirmed location with the light leakage regions, and adjusting the intensity of electricity applied to the first light source unit 133-1 arranged in the confirmed first light emitting region.

The storage unit 183 stores information of the predetermined light leakage regions and location information of the first light source units 133-1 arranged in the first light emitting regions corresponding to the light leakage regions.

The storage unit 183 may also store turn-off time of the first light source units 133-1 so that the first light source units 133-1 are temporarily turned off when light leakage is prevented.

The storage unit 183 may also store the intensity of the electricity applied to the first light source units 133-1 based on a brightness of black or dark color of the black or dark image.

The light driving units 132 each drive a light source unit of the backlight unit 130 based on commands from the control unit 182. The LEDs arranged in the first light emitting regions may be independently driven.

The first light driving unit 132a independently drives the first light source units 133-1 of the backlight unit 130 based on commands from the control unit 182.

The second light driving unit 132b simultaneously drives the second light source units 133-2 of the backlight unit 130 based on commands from the control unit 182.

A location of the light leakage regions may be previously confirmed and then LEDs of the backlight unit 130 are arranged, and when a black image needs to be displayed on the display panel 110, the LEDs arranged in the light leakage regions are temporarily turned off, whereby light leakage according to reduction in luminance may be prevented.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A curved display device comprising:
   a display panel having a constant curvature and capable of displaying an image;
   a backlight unit having the same curvature as that of the display panel, disposed at a rear surface of the display panel, and capable of emitting light to the display panel; and
   a control unit locally controlling light emission of the backlight unit such that a luminance of a light leakage region of the display panel is adjusted,
   wherein the light leakage region is a region predetermined based on a curvature and size of the display panel.

2. The curved display device according to claim 1, wherein the control unit locally controls light emission of the backlight unit when an image to be displayed on the display panel is a dark image.

3. The curved display device according to claim 2, wherein the control unit controls luminance in a location corresponding to the light leakage region to be decreased and luminance in a remaining location to be maintained when locally controlling light emission of the backlight unit.

4. The curved display device according to claim 1, wherein the backlight unit comprises a base having the same curvature as that of the display panel, a plurality of light source units spaced apart from each other on the base, and light driving units each driving the light source unit.

5. The curved display device according to claim 4, wherein the light source units comprise a plurality of light emitting diode (LED) arrays.

6. The curved display device according to claim 5, wherein the light driving unit is of a flat panel type.

7. The curved display device according to claim 5, wherein the LED arrays are arranged in a direction perpendicular to the curvature of the display panel.

8. The curved display device according to claim 7, wherein the display panel has data lines formed to match a location of the LED arrays.

9. The curved display device according to claim 4, wherein the light source units are arranged at irregular intervals.

10. The curved display device according to claim 1, wherein the backlight unit directly emits light.

11. The curved display device according to claim 1, further comprising a storage unit storing location information of a light source unit of the backlight unit disposed in a location corresponding to the predetermined light leakage region.

12. The curved display device according to claim 11, wherein the control unit analyzes an image signal to be displayed on the display panel to determine a location where a dark image is to be displayed and independently control the light source unit arranged in the determined location to be turned off when the determined location belongs to the predetermined light leakage region.

13. The curved display device according to claim 12, wherein the control unit controls a level of the luminance based on brightness of dark color of the dark image.

14. The curved display device according to claim 1, wherein the backlight unit comprises a first light source unit disposed in the light leakage region, a first light driving unit driving the first light source unit, a second light source unit disposed in a remaining region, and a second light driving unit driving the second light source unit.

15. The curved display device according to claim 14, wherein the control unit analyzes an image signal to be displayed on the display panel and control the first light source unit to be turned off when an image to be displayed on the light leakage region is a dark image.

16. The curved display device according to claim 15, wherein the control unit controls the second light source unit to be turned on when an image to be displayed on the remaining region is a dark image.

17. The curved display device according to claim 1, wherein the display panel comprises a TFT array panel and a color filter array panel that have the constant curvature.

18. The curved display device according to claim 1, further comprising a diffusion plate disposed between the backlight unit and the display panel and diffusing light emitted from the backlight unit.

19. A curved display device comprising:
   a display panel capable of displaying an image and curved;
   a backlight unit disposed at a rear surface of the display panel, capable of emitting light to the display panel, and curved corresponding to the curvature of the display panel; and
   a control unit independently controlling light emission of a plurality of first light emitting regions and a plurality of second light emitting regions of the backlight unit, wherein the first light emitting regions emits light to a plurality of light leakage regions of the display panel and the second light emitting regions emit light to the remaining regions of the display panel when an image is displayed, wherein the light leakage region is a region predetermined based on a curvature and size of the display panel.

20. The curved display device according to claim 19, wherein the control unit controls luminance of the first light emitting regions to be decreased when a dark image is to be displayed on the light leakage regions of the display panel.

21. The curved display device according to claim 19, further comprising a storage unit storing location information of the light leakage regions and location information of the first light emitting regions respectively corresponding to the light leakage regions, wherein the control unit analyzes an image signal to be displayed on the display panel to determine whether a dark image is displayed on at least one of the light leakage regions, confirms a location of the first light emitting region corresponding to the light leakage region if it is determined that a dark image is displayed on the at least one light leakage region, and independently controls a light source unit disposed in the confirmed first light emitting region to be turned off.

22. A curved display device comprising:
a display panel having a constant curvature and capable of displaying an image; and
a backlight unit having a first light emitting region capable of emitting light to a light leakage region of the display panel and a second light emitting region emitting light to a remaining region of the display panel, wherein the first light emitting region and the second light emitting region independently emit light and light emission thereof is independently blocked, wherein the light leakage region is a region predetermined based on a curvature and size of the display panel.

23. The curved display device according to claim 22, wherein the backlight unit comprises a base having the constant curvature, a plurality of light source units disposed in the first and second light emitting regions, and light driving units disposed on the base and each driving the light source unit.

24. The curved display device according to claim 23, wherein the light source units comprise a first light source unit disposed in the first light emitting region and a second light source unit disposed in the second light emitting region.

25. The curved display device according to claim 24, wherein the first light source unit is turned off when a dark image is to be displayed on the light leakage region.

26. The curved display device according to claim 23, wherein the light source units are arranged at irregular intervals.

27. The curved display device according to claim 22, wherein the backlight unit directly emits light.

28. A method of improving image quality in a curved display device, the method comprising:
emitting light independently from a first light emitting region to a light leakage region of the curved display device and from a second light emitting region to a remaining region of the curved display device,
wherein the light leakage region is a region predetermined based on a curvature and size of the display panel.

* * * * *